US012589745B2

(12) United States Patent
Schmollgruber et al.

(10) Patent No.: US 12,589,745 B2
(45) Date of Patent: Mar. 31, 2026

(54) VISUAL GUIDANCE METHOD FOR IMPROVING AUTONOMOUS NAVIGATION WITH ROW FOLLOWING CORRECTIONS IN STEREO CAMERA SYSTEMS

(71) Applicant: Stereolabs SAS, Montrouge (FR)

(72) Inventors: Cecile Schmollgruber, Boulogne (FR); Edwin Azzam, Antony (FR); Olivier Braun, Vanves (FR); Ludovick Razafimandimby, Leuville sur Orge (FR)

(73) Assignee: Stereolabs SAS, Montrouge (FR)

( * ) Notice: Subject to any disclaimer, the term of this patent is extended or adjusted under 35 U.S.C. 154(b) by 0 days.

(21) Appl. No.: 19/078,269

(22) Filed: Mar. 12, 2025

(65) Prior Publication Data

US 2025/0360922 A1     Nov. 27, 2025

Related U.S. Application Data

(60) Provisional application No. 63/651,915, filed on May 24, 2024.

(51) Int. Cl.
*B60W 30/12* (2020.01)
*G06V 20/56* (2022.01)

(52) U.S. Cl.
CPC ........... *B60W 30/12* (2013.01); *G06V 20/588* (2022.01)

(58) Field of Classification Search
CPC ............. G06V 20/588; B60W 2552/53; G06T 2207/30256; G01C 21/3819
See application file for complete search history.

(56) References Cited

U.S. PATENT DOCUMENTS 8,050,863 B2     11/2011  Trepagnier et al.
2018/0373264 A1*  12/2018  Madsen ............... G05D 1/0088
(Continued)

FOREIGN PATENT DOCUMENTS

WO     2017163596 A1     9/2017
WO     2024049315 A1     3/2024

OTHER PUBLICATIONS

A. Velasquez, et al., Multi-Sensor Fusion based Robust Row Following for Compact Agricultural Robots, Field Robotics, 2:1291-1319, Jun. 2022.
(Continued)

*Primary Examiner* — Kenneth J Malkowski
(74) *Attorney, Agent, or Firm* — Daylight Law, P.C.

(57) ABSTRACT

Systems and methods related to visual guidance for improving autonomous navigation with row following corrections in stereo camera systems are disclosed herein. A visual positioning system may implement a method for navigating a vehicle. The method may comprise: receiving navigation coordinates defining a route comprising a straight path; detecting detected lines that are parallel to the straight path based on images received from at least one camera on the vehicle; accessing ground truth data; deriving vehicle coordinates from the ground truth data; determining a centerline in vehicle coordinates based on the detected lines; determining corrected vehicle coordinates based on the centerline in vehicle coordinates and the vehicle coordinates from the ground truth data; and generating control signals to navigate the vehicle along the route using the corrected vehicle coordinates. The visual positioning system may maintain localization accuracy and provide drift correction in the presence of poor GPS or radio localization.

30 Claims, 8 Drawing Sheets

(56)                 References Cited

U.S. PATENT DOCUMENTS

| 2020/0317194 A1* | 10/2020 | Yan ....................... B60W 30/12 |
| 2022/0198935 A1* | 6/2022 | Adams ................ B60W 60/001 |
| 2023/0365257 A1* | 11/2023 | Reichenbach ........ B64C 39/024 |

OTHER PUBLICATIONS

R. Kümmerle, et al., G2o: A general framework for graph optimi-
zation, 2011 IEEE International Conference on Robotics and Auto-
mation, Shanghai, China, 2011, pp. 3607-3613.
International Search Report and Written Opinion dated Sep. 5, 2025
from International Application No. PCT/IB2025/055000, 9 pages.
P. Cudrano et al. (2020). Advances in centerline estimation for
autonomous lateral control. 2020 IEEE Intelligent Vehicles Sym-
posium (IV), 1415-1422.

\* cited by examiner

Line1 || in $x_0$ and $x_1$ observations  210

Line1 || in $x_0$ and $x_2$ observations  211

Line2 || in $x_3$ and $x_4$ observations  220

Line2 || in $x_3$ and $x_5$ observations  221

Pose nodes  $x_k$

Line factors

Key points factors

Obstacle Map 401        Navigation Image 402

Raw Image 400

506

504

505

Navigation Image 500

FIG. 8      800

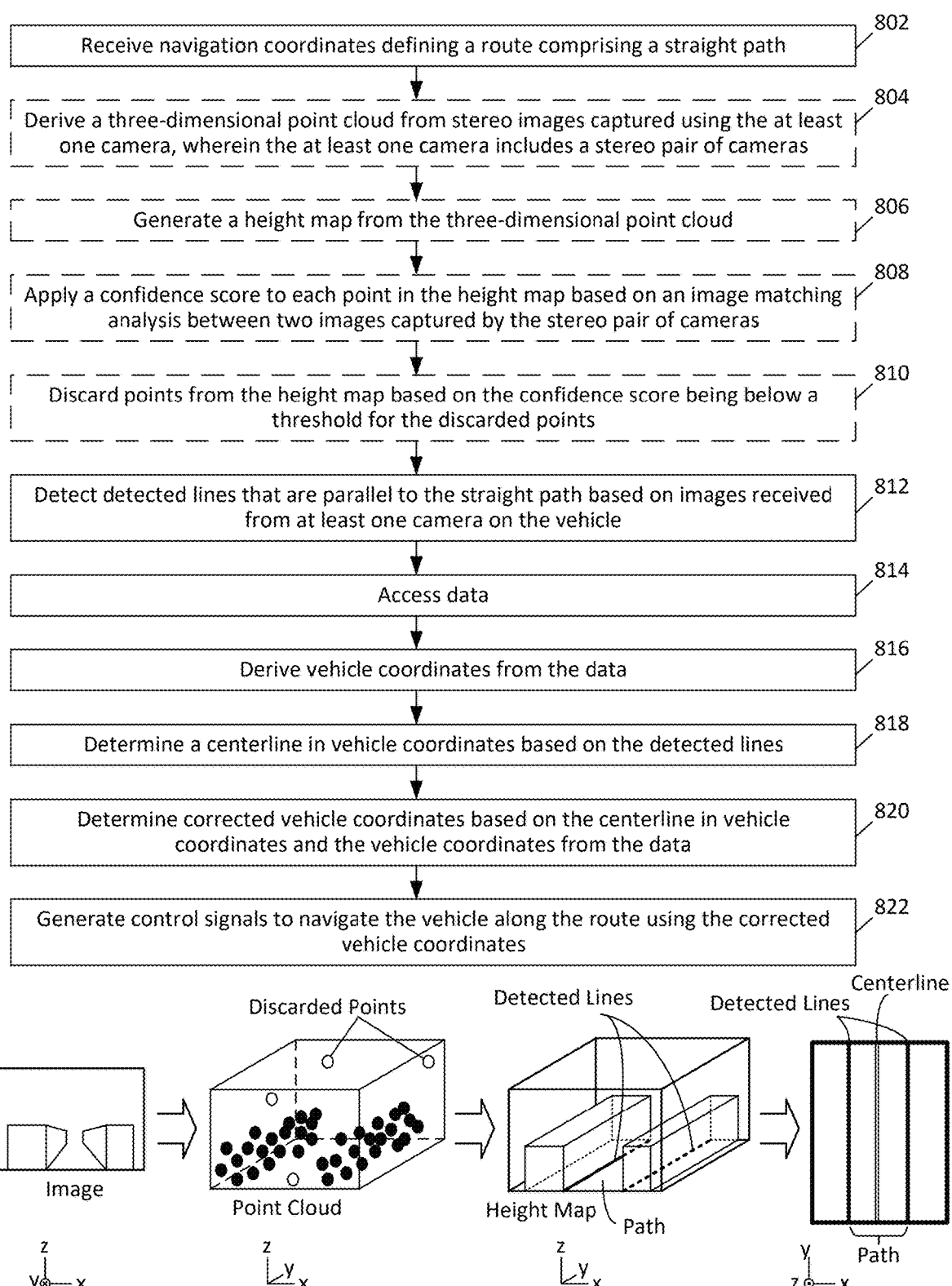

802 — Receive navigation coordinates defining a route comprising a straight path 804 — Derive a three-dimensional point cloud from stereo images captured using the at least one camera, wherein the at least one camera includes a stereo pair of cameras 806 — Generate a height map from the three-dimensional point cloud 808 — Apply a confidence score to each point in the height map based on an image matching analysis between two images captured by the stereo pair of cameras 810 — Discard points from the height map based on the confidence score being below a threshold for the discarded points 812 — Detect detected lines that are parallel to the straight path based on images received from at least one camera on the vehicle 814 — Access data 816 — Derive vehicle coordinates from the data 818 — Determine a centerline in vehicle coordinates based on the detected lines 820 — Determine corrected vehicle coordinates based on the centerline in vehicle coordinates and the vehicle coordinates from the data 822 — Generate control signals to navigate the vehicle along the route using the corrected vehicle coordinates Image Discarded Points Point Cloud Detected Lines Height Map   Path Detected Lines   Centerline Path

VISUAL GUIDANCE METHOD FOR IMPROVING AUTONOMOUS NAVIGATION WITH ROW FOLLOWING CORRECTIONS IN STEREO CAMERA SYSTEMS

CROSS REFERENCE TO RELATED APPLICATIONS

This application claims the benefit of U.S. Provisional Patent Application No. 63/651,915, filed May 24, 2024, which is incorporated by reference herein in its entirety for all purposes.

BACKGROUND

The present description relates to the field of precision localization technologies and, more specifically, to systems and methods for enhancing the accuracy and reliability of navigation and positioning across a variety of applications. This includes, but is not limited to, autonomous localization technologies for autonomous vehicles, mobile robotics, autonomous tractors, and any systems requiring precise localization to operate effectively within their respective environments.

SUMMARY

This disclosure relates to visual guidance methods for improving autonomous navigation with row following corrections in stereo camera systems. In the field of autonomous navigation for tractors, cars, or other vehicles, the predominant methods for achieving localization have been through the use of Global Positioning System (GPS) and/or radio beacon technologies. These technologies can enable accurate navigation throughout operational missions or paths. However, their effectiveness is subject to considerable reduction under a variety of challenging conditions, including but not limited to, indoor environments, multipath interference, limited satellite visibility, and weak signal reception. As a result, the precision in localization is significantly compromised, which in turn jeopardizes the safety of the autonomous vehicle and its immediate environment, thereby elevating the risk of mission failures.

Autonomous or semi-autonomous vehicles can navigate in various environments, such as cities, open fields, farmlands, or warehouses, by being programmed to follow a route comprising one or more straight paths. Autonomous or semi-autonomous vehicles may include robots, cars, trucks, tractors, mobile devices, drones, forklifts, autonomous mobile robots (AMRs), and autonomous guided vehicles (AGVs). A path can be a road, a lane, an aisle, an edge of a field or any traversable zone free (or intended to be free) of obstacles. For example, with modern GPS technology, farmers can define precise automated paths for agricultural machinery. These paths are often referred to as AB lines, where A and B are the starting and ending points of the path respectively. In other words, autonomous vehicles can navigate on straight paths between designated waypoints.

Waypoints can be identified by world coordinates in a world coordinate system such as GPS coordinates in a GPS system. The vehicle may move from one waypoint to the next by using a GPS and/or any radio localization system. For example, a straight path can be defined by a centerline equation in world coordinates. To control the vehicle's motion, steering signals can be sent based on the centerline equation and measured vehicle positions, ensuring the vehicle remains on the centerline. Accordingly, ensuring the accuracy of measured vehicle positions is crucial. However, the inherent precision of radio localization systems may not always be sufficient for various applications. While adding vision guidance systems, IMUs (Inertial Measurement Units), or wheel odometry systems can improve precision, these additional sensors can also drift over time, introducing new localization errors.

A visual positioning system to maintain localization accuracy in the presence of poor (or absent) GPS and/or radio localization is described herein. This system can improve the accuracy of GPS and/or radio localization by detecting lines in images (2D, 2.5D, or 3D) to correct lateral drifts. The visual positioning system may include a drift correction system to correct the drift from other positioning systems, such as a visual/inertial odometry system, a GPS and/or radio localization system, or a wheel odometry system. The drift correction system may receive images received from at least one camera sensor located on the vehicle. The drift correction system may include preprogrammed location information (e.g., the locations of electronic tags within the environment).

The visual positioning method can be employed to detect lines that are parallel to the desired path of travel, and more specifically lines parallel to straight path sections. The detected lines may represent visible features in the environment. These features can include field boundaries, crop rows, roadsides, shelving, wall-ground intersections (both indoors and outdoors, such as in warehouses), vineyard trellises, AMR lane markings or any other similar structures. Throughout this description, these lines may be referred to as "edges" because they typically define the boundaries of the desired path of travel.

Detected lines (edges) may be expressed as camera coordinates or vehicle coordinates (e.g., with a fixed translation and/or rotations with respect to the camera coordinate frame) as the cameras may be rigidly attached to the vehicle. Lines can be detected with deep learning methods or computer vision methods from two-dimensional (2D) images or three-dimensional (3D) point clouds. A line measurement can be described by the line equation expressed in vehicle coordinates and its confidence score, which is the probability that this measurement is correct or not. For example, the confidence may be expressed as a number between 0 and 1, where 1 is more confident and 0 is less confident.

The visual positioning system may include a stereo imaging system outputting images and depth information. A visual perception algorithm can use the depth information as an input to detect edges (line boundaries of a path) and determine the centerline equation. For instance, the visual position system may use a 3D point cloud or height map output by the stereo imaging system. A confidence score may be associated with each point in the height map. This confidence score can be based on how well (or poorly) pixels in the left and right images in a stereo pair are matched together. Advantageously, the confidence score may be used to discard some points of the height map that are too noisy (e.g., points with confidence score below a predetermined threshold).

The centerline may be offset from the middle of the path (e.g., not in the center), as long as the centerline is parallel to the path (e.g., parallel to one of the edges). Throughout this description, the determination of the centerline equation may be referred to as a "centerline measurement" because this is a measurement resulting from a capture by an imaging system and processing by the visual perception algorithm. The line detection and centerline measurement may be performed as an autonomous or semiautonomous vehicle moves through different locations.

Relationships between poses, such as a priori knowledge of a scene, may persist beyond any camera field of view. One example of a priori knowledge may be lines parallel to straight path sections. As these lines follow the path, their orientation can be measured at different places without any field of view limitation. In other words, different sections of the same line can be observed at different time steps, even if the earlier sections are no longer in the field of view when observing the later sections.

The centerline orientation may remain constant when navigating a straight path, and it can be used to correct any possible localization drift. The heading of the centerline can be determined to correct angular drifts that cannot be well corrected with other methods or sensors. Factors for drift correction may be combined with outputs of one or more other localization systems or sensors. Line factors, key points factors (visual), IMU factors, GPS factors, and wheel odometry factors can be fused to correct the path of the vehicle. Given the observation of the same line in multiple images, the accumulated drift of the system may be fixed using factor graph optimization or other methods.

In specific embodiments of the invention, a method for navigating a vehicle is provided. The method comprises: receiving navigation coordinates defining a route comprising a straight path, detecting detected lines that are parallel to the straight path based on images received from at least one camera on the vehicle, accessing ground truth data, deriving vehicle coordinates from the ground truth data, determining a centerline in vehicle coordinates based on the detected lines, determining corrected vehicle coordinates based on the centerline in vehicle coordinates and the vehicle coordinates from the ground truth data, and generating control signals to navigate the vehicle along the route using the corrected vehicle coordinates.

In specific embodiments of the invention, a system for navigating a vehicle is provided. The system comprises: one or more cameras mounted on the vehicle, one or more actuators, one or more processors, and one or more non-transitory computer-readable media storing instructions that, when executed by the one or more processors, cause the system to execute a method. The method comprises: receiving navigation coordinates defining a route comprising a straight path, detecting detected lines that are parallel to the straight path based on images received from the one or more cameras, accessing ground truth data, deriving vehicle coordinates from the ground truth data, determining a centerline in vehicle coordinates based on the detected lines, determining corrected vehicle coordinates based on the centerline in vehicle coordinates and the vehicle coordinates from the ground truth data, and generating control signals for the one or more actuators to navigate the vehicle along the route using the corrected vehicle coordinates.

In specific embodiments of the invention, one or more non-transitory computer-readable media storing instructions are provided. When executed by one or more processors, the one or more non-transitory computer-readable media cause the one or more processors to conduct a method for navigating a vehicle. The method comprises: receiving navigation coordinates defining a route comprising a straight path, detecting detected lines that are parallel to the straight path based on images received from at least one camera on the vehicle, accessing ground truth data, deriving vehicle coordinates from the ground truth data, determining a centerline in vehicle coordinates based on the detected lines, determining corrected vehicle coordinates based on the centerline in vehicle coordinates and the vehicle coordinates from the ground truth data, and generating control signals to navigate the vehicle along the route using the corrected vehicle coordinates.

BRIEF DESCRIPTION OF THE DRAWINGS

The accompanying drawings illustrate various embodiments of systems, methods, and embodiments of various other aspects of the disclosure. A person with ordinary skills in the art will appreciate that the illustrated element boundaries (e.g., boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 8 provides an example of a method for navigating a vehicle in accordance with specific embodiments of the inventions disclosed herein.

DETAILED DESCRIPTION

Figure 1:
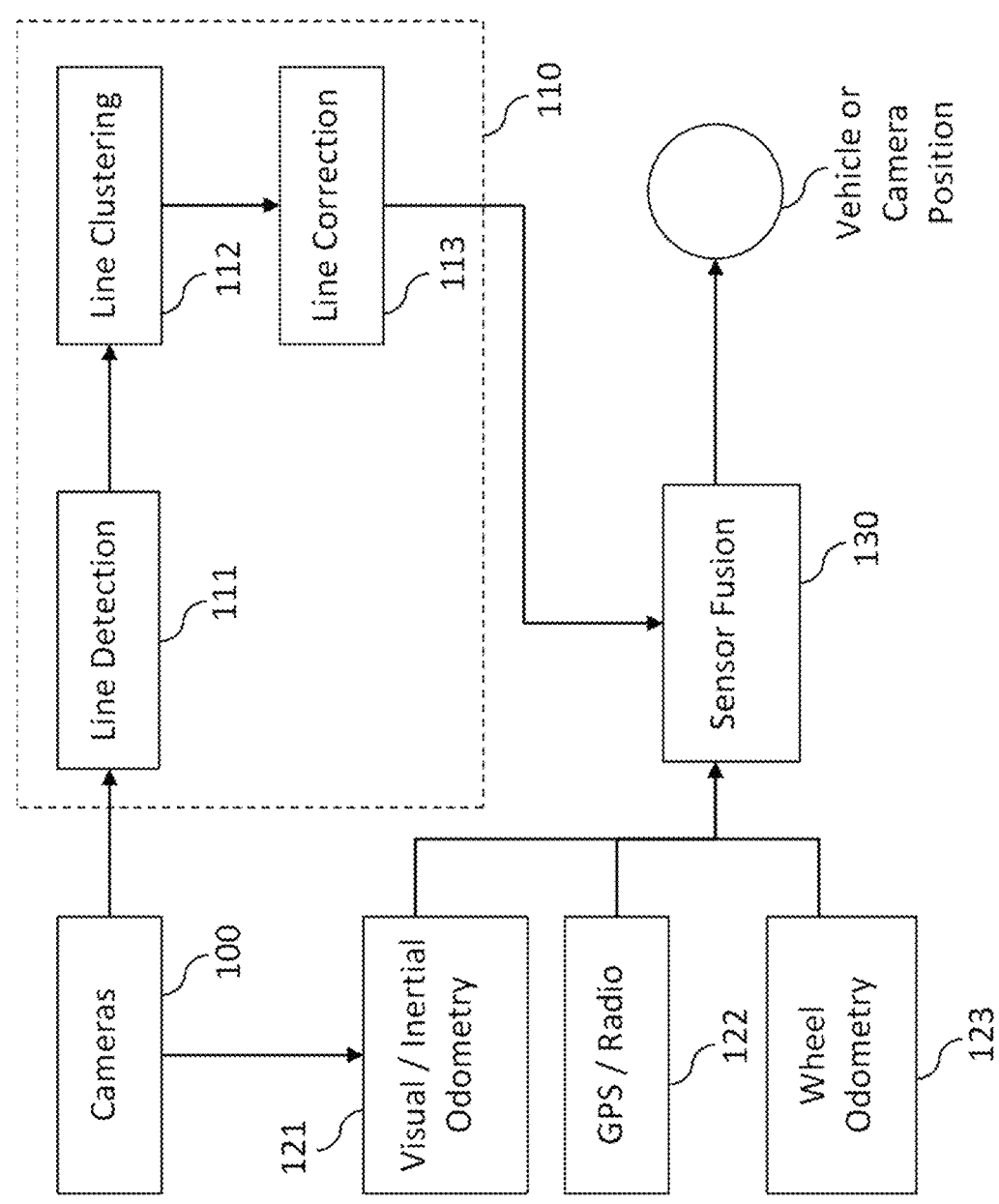
FIG. 1 provides an example of a visual positioning system (VPS) and workflow for navigating a vehicle in accordance with specific embodiments of the inventions disclosed herein.

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described.

Different systems and methods for visual guidance for improving autonomous navigation with row following corrections in stereo camera systems in accordance with the summary above are described in detail in this disclosure. The methods and systems disclosed in this section are nonlimiting embodiments of the invention, are provided for explanatory purposes only, and should not be used to constrict the full scope of the invention. It is to be understood that the disclosed embodiments may or may not overlap with each other. Thus, part of one embodiment, or specific embodiments thereof, may or may not fall within the ambit of another, or specific embodiments thereof, and vice versa. Different embodiments from different aspects may be combined or practiced separately. Many different combinations and sub-combinations of the representative embodiments shown within the broad framework of this invention, that may be apparent to those skilled in the art but not explicitly shown or described, should not be construed as precluded.

Autonomous or semi-autonomous vehicles can navigate in various environments, such as cities, open fields, farmlands, or warehouses, by being programmed to follow a route comprising one or more straight paths. Autonomous or semi-autonomous vehicles may include robots, cars, trucks, tractors, mobile devices, drones, forklifts, autonomous mobile robots (AMRs), and autonomous guided vehicles (AGVs). A path can be a road, a lane, an aisle, an edge of a field or any traversable zone free (or intended to be free) of obstacles. For example, with modern GPS technology, farmers can define precise automated paths for agricultural machinery. In other words, autonomous vehicles can navigate on straight paths between designated waypoints.

Waypoints can be identified by world coordinates such as GPS coordinates. The vehicle may move from one waypoint to the next by using a GPS and/or any radio localization system. For example, a straight path can be defined by a centerline equation in world coordinates. To control the vehicle's motion, steering signals can be sent based on the centerline equation and measured vehicle positions, ensuring the vehicle remains on the centerline. Accordingly, ensuring the accuracy of measured vehicle positions is crucial. However, the inherent precision of radio localization systems may not always be sufficient for various applications. While adding vision guidance systems, IMUs (Inertial Measurement Units), or wheel odometry systems can improve precision, these additional sensors can also drift over time, introducing new localization errors.

A visual positioning system to maintain localization accuracy in the presence of poor (or absent) GPS and/or radio localization is described herein. This system can improve the accuracy of GPS and/or radio localization by detecting lines in images (2D, 2.5D, or 3D) to correct lateral drifts. The visual positioning system may include a drift correction system to correct the drift from other positioning systems, such as a visual/inertial odometry system, a GPS and/or radio localization system, or a wheel odometry system. The drift correction system may receive images received from at least one camera sensor located on the vehicle. The drift correction system may include preprogrammed location information (e.g., the locations of electronic tags).

The visual positioning method can be employed to detect lines that are parallel to the desired path of travel, and more specifically lines parallel to straight path sections. The detected lines may represent visible features in the environment. These features can include field boundaries, crop rows, roadsides, shelving, wall-ground intersections (both indoors and outdoors, such as in warehouses), vineyard trellises, or any other similar structures. Throughout this description, these lines may be referred to as "edges" because they typically define the boundaries of the desired path of travel.

Detected lines (edges) can be encoded by linear equations. These may be originally expressed as camera coordinates (e.g., in the camera coordinate frame). More generally, the detected lines can be expressed in vehicle coordinates (e.g., with a fixed translation and/or rotations with respect to the camera coordinate frame) as the cameras may be rigidly attached to the vehicle.

Lines can be detected with deep learning methods or computer vision methods from 2D images or 3D point clouds. A line measurement can be described by the line equation expressed in vehicle coordinates and its confidence score, which is the probability that this measurement is correct or not. For example, the confidence may be expressed as a number between 0 and 1, where 1 indicates that there is clearly enough visual information to estimate a good line and 0 indicates that no line is detected or that there are a few visual elements, but they do not fit a line.

In a preferred embodiment, the visual positioning system includes a stereo imaging system outputting images and depth information, and a visual perception algorithm can use the depth information as an input to detect edges (line boundaries of a path) and determine the centerline equation. For instance, the stereo imaging system can output a 3D point cloud. The 3D point cloud can be converted into a height map from a ground plane, this height map being sometimes referred to as a "2.5D" height map as some of the 3D information is lost. The 2.5D height map includes a horizontal grid in (x,y) coordinates and a vertical height (z) in that grid. Lines can be detected based on the 2.5D height map combined with other inputs, such as deep learning methods or computer vision methods applied to the 2D images. In generating a height map, it is possible to assess a confidence score associated with each point. This confidence score can be based on how well (or poorly) pixels in the left and right images in a stereo pair are matched together. Advantageously, the confidence score may be used to discard some points of the height map that are too noisy, in other words, points with confidence score below a predetermined threshold.

Several approaches exist for determining the centerline equation in vehicle coordinates. The centerline may be determined by averaging the equations of the left and right edges of the path or detected line. The centerline may be determined via a linear combination of a plurality of detected line equations if the path is not in the middle of a left edge and right edge. The centerline may be determined by offsetting one of the detected lines by half the width of the straight path or any other appropriate distance. In a preferred embodiment, the average, or more generally a linear combination of detected lines, may be used to average out the noise. The centerline may be used to perform line clustering and for determining vehicle control signals. However, the centerline doesn't need to be strictly in the middle of the path, as long as the centerline is parallel to the path (such as parallel to one of the edges). Throughout this description, the determination of the centerline equation may be referred to as a "centerline measurement" because this is a measurement resulting from a capture by an imaging system and processing by the visual perception algorithm.

The line detection and centerline measurement may be performed as an autonomous or semiautonomous vehicle moves through different locations. Each time step during which a detection and measurement is performed may correspond to a camera frame. A line detection may be performed repeatedly in each camera frame. The line detection can result in a plurality of detected lines in each frame. Each detected line may be assigned a unique identifier, such as an identification number. The line identification number may be consistent from frame to frame. There may be different ways to determine when a line in a frame corresponds to a line in preceding frames. For instance, the line equation can be used. Alternatively, each time the line detection is performed, a confidence score may be determined. When the confidence score drops below a certain threshold, a new line identification identifier can be assigned, for instance by incrementing the current line identification number. In other words, when multiple points are not well aligned, it may be assumed that this is because there is a new straight-line portion beginning and the line identification number may be incremented. This confidence score can be determined within each frame, thereby avoiding the need for location information. Alternatively, the line identification number can also be incremented after a predetermined number of frames. This could be beneficial if the confidence determination doesn't detect very low curvatures.

A clustering step may be performed using the detected lines. The history of the vehicle (or camera) locations may be maintained while navigating along the same line and associated with each line identification number. This may produce a cluster of location histories associated with each line identification number. Groups of locations sharing the same line identification number may be assembled into a cluster of locations—a set of 3D positions observing the same line measurement.

Relationships between poses, such as a priori knowledge of a scene, may persist beyond any camera field of view. One of these a priori knowledge are lines parallel to straight path sections. As these lines follow the path, their orientation can be measured at different places without any field of view limitation. In other words, different sections of the same line can be observed at different time steps, even if the earlier sections are no longer in the field of view when observing the later sections.

The centerline orientation may remain constant when navigating a straight path, and it can be used to correct any possible localization drift. The heading of the centerline can be determined to correct angular drifts that cannot be well corrected with other methods or sensors. Factors for drift correction may be combined with outputs of one or more other localization systems or sensors. Line factors, key points factors (visual), IMU factors, GPS factors, and wheel odometry factors can be fused to correct the path of the vehicle. Given the observation of the same line in multiple images, the accumulated drift of the system may be fixed using factor graph optimization or other methods.

FIG. 1 illustrates a visual positioning system (VPS) and workflow for navigating a vehicle in accordance with specific embodiments of the inventions disclosed herein. The visual positioning system includes drift correction system 110. Drift correction system 110 can be used to correct the drift from other positioning systems, such as visual/inertial odometry system 121, GPS/radio localization system 122, or wheel odometry system 123. GPS/radio localization system 122 may be a GPS system, a radio system, or both. Visual/inertial odometry system 121 may be a visual odometry system, an inertial odometry system, or both.

Drift correction system 110 may receive images from camera 100 and other sensors located on the vehicle. A visual perception method can be employed for line detection step 111. The detected lines may be parallel to the desired path of travel, and more specifically lines parallel to straight path sections. The detected lines may represent visible features in the environment. These features can include field boundaries, crop rows, roadsides, shelving-ground intersections, wall-ground intersections (both indoors and outdoors, such as in warehouses), vineyard trellises, or any other similar structures. These lines may be referred to as "edges" because they typically define the boundaries of the desired path of travel.

Detected lines (edges) can be encoded by linear equations. These may be originally expressed as camera coordinates (e.g., in the camera coordinate frame). More generally, the detected lines can be expressed in vehicle coordinates (e.g., with a fixed translation and/or rotations with respect to the camera coordinate frame) as the cameras may be rigidly attached to the vehicle.

Line detection step 111 may be performed using deep learning methods or computer vision methods from 2D images, 2.5D height maps, obstacle maps, or 3D point clouds. A line measurement can be described by the line equation expressed in vehicle coordinates and its confidence, which is the probability that this measurement is correct or not. For example, the confidence may be expressed as a number between 0 and 1, where 1 indicates that there is clearly enough visual information to estimate a good line and 0 indicates that no line is detected or that there are a few visual elements, but they do not fit a line.

Line clustering step 112 may be performed using the detected lines (e.g., from line detection step 111). The history of vehicle (or camera) locations may be maintained while navigating along the same line. Locations may be organized according to, or associated with, each line identification number. Grouping locations together may produce a cluster of location histories associated with each line identification number. Groups of locations sharing the same line identification number may be assembled into a cluster of locations-a set of 3D positions observing the same line measurement. When all pairs of locations and lines within each cluster are linked together, a nonlinear optimization method can be performed to determine the optimal or most likely orientation and position for each camera by minimizing the overall observed drift and subsequently correcting the localization drift.

The centerline orientation may remain constant when navigating a straight path, and it can be used to correct any possible localization drift. In line correction step 113, the heading of the centerline can be determined to correct angular drifts that cannot be well corrected with other methods or sensors. In particular, line correction step 113 may enable the correction of a yaw angle (vehicle going left or right). Line correction step 113 may output factors that can be used for performing this drift correction, such as the line heading parameters (e.g., horizontal angular orientation in world coordinates). This results in improved accuracy of the poses. This is particularly important in navigation systems, as IMUs can correct other angles with gravity accelerometers, but cannot correct a drift with respect to the vertical axis (e.g., yaw angle).

The result of line correction step 113 can be combined with the outputs of one or more other localization systems or sensors (121, 122, or 123) in a sensor fusion step 130. For example, line correction step 113 may output constraints (e.g., the line factor) into sensor fusion step 130 where the constraints are combined with other information. Sensor fusion step 130 may perform a nonlinear optimization method to determine the optimal or most likely orientation and position for each camera by minimizing the overall observed drift and subsequently correcting the localization drift. The nonlinear optimization method can be a factor graph optimization, a Kalman filter, an extension of a Kalman filter (EKF, UKF), a Particle Filtering, a Maximum A Posteriori (MAP) estimation, and/or association techniques. Factor graph optimization can fuse line factors, key points factors (visual), IMU factors, GPS factors, and wheel odometry factors in the same optimization step.

Drift correction system 110 may preferably run at a lower frequency than the other localization systems. For instance, for a vehicle moving with a velocity between 5 km/h and 10 km/h and comprising a camera acquiring images at 30 Hz, drift correction system 110 can run at 1 Hz (for each keyframe) while visual/inertial odometry system 121 may run at 30 Hz (for all frames). Indeed, visual/inertial odometry system 121 may have a short time (3-4 seconds) until it starts to accumulate too many errors (drift), whereas line correction step 113 may not be subject to drift. This allows for the reduction of the computational load of drift correction system 110 while the benefits of the drift correction remain absolute as long as the vehicle navigates on a straight path. This can allow a vehicle to follow the same line for long distances, such as 1 km, without any drift.

Figure 2:
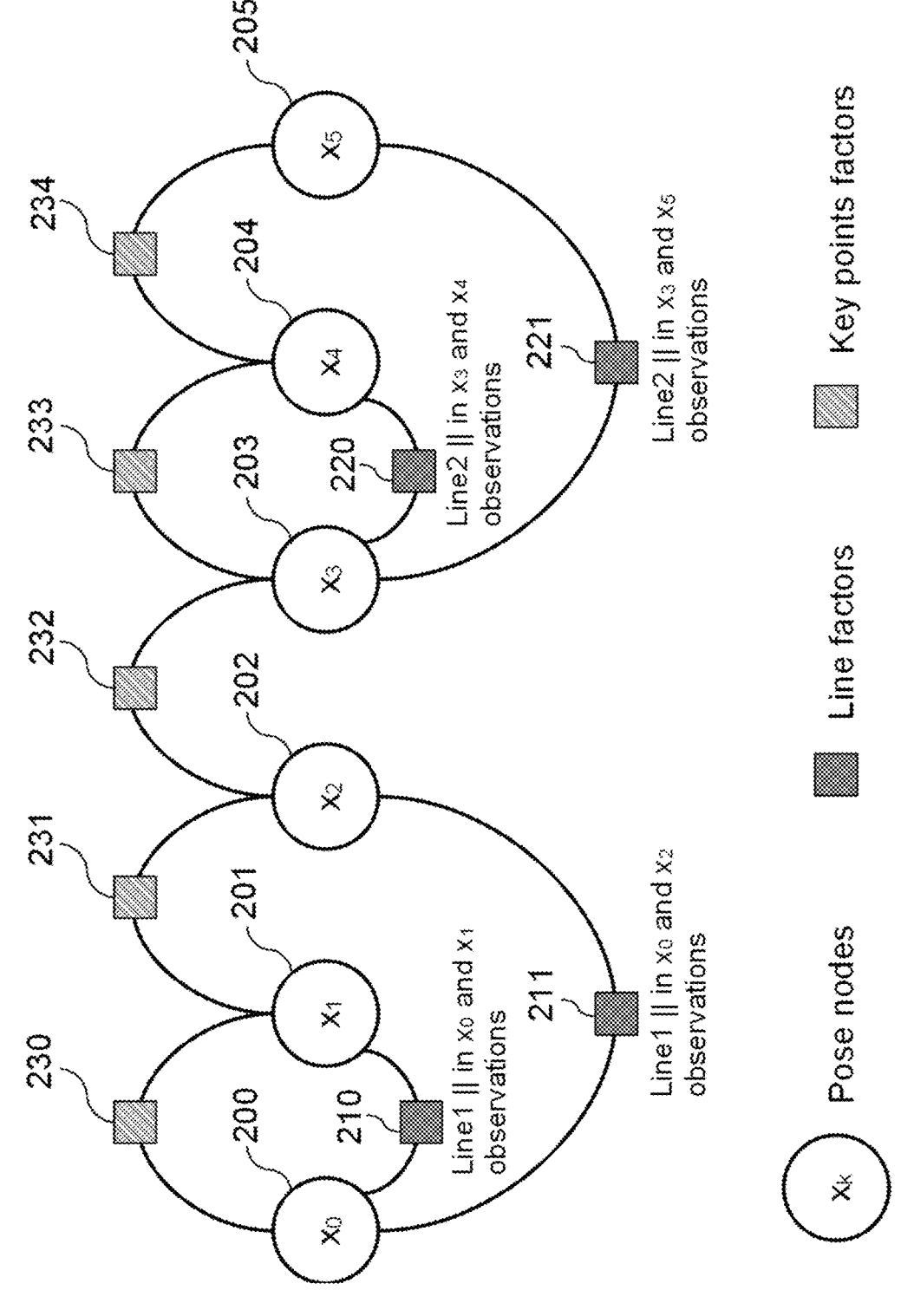
FIG. 2 provides an example of a VSP factor graph in accordance with specific embodiments of the inventions disclosed herein.

FIG. 2 illustrates an exemplary visual positioning system factor graph in accordance with specific embodiments of the inventions disclosed herein. Factor graph optimization is a technique that can be used to find the most likely values of variables in a complex system. Factor graph optimization may rely on the relationships between variables and the factors that influence them. The goal is to find a set of values for the variables that best satisfies all the factors in the graph. This usually translates to minimizing a function that measures the total disagreement between the predicted and observed values. The variables to be optimized may include the vehicle (or camera) poses $x_0$, $x_1$, $x_2$, $x_3$, $x_4$, and $x_5$, also referred to as $x_k$ where k is a time step. For example, $x_0$ is the vehicle pose at time $t_0$, $x_1$ is the vehicle pose at time $t_1$, etc. A pose may include both the orientation and the location of the vehicle (or camera).

The vehicle poses may be related to each other by key points that are fixed visual features in the environment and can be observed in each image as long as they remain in the field of view. These key points may be tracked from frame to frame and may define a relationship between the poses—the relationship being each key point doesn't move. In other words, given two successive poses $x_k$ and $x_{k+1}$, a key point should have the same world coordinates. Key points can be used as a first set of factors making a relationship between pose variables. A limitation of this method is that key points are local, and may only persist in a few frames, as long as the feature remains in the field of view. This means that errors can only be corrected with respect to local information, which does not help correct drifts over long periods of time. To improve accuracy, including long-term accuracy, vehicle poses may be related to each other using a variety of factors. For example, factor graph optimization can fuse line factors, key points factors (visual), IMU factors, GPS factors, wheel odometry factors, and other factors in the same optimization step.

According to a preferred embodiment, other factors that persist beyond any camera field of view can be added to the factor graph. These factors may be relationships between poses such as a priori knowledge of a scene. One piece of a priori knowledge may be lines parallel to straight path sections. As these lines follow the path, their orientation can be measured at different places without any field of view limitation. Different sections of a same line (having same line identifier) can be observed at different time steps, even if the earlier sections are no longer in the field of view when observing the later sections. With the line detection and centerline determination, it is possible to add a factor in the factor graph between distant poses. This may help correct drifts over long periods of time.

In the example factor graph represented in FIG. 2, each node 200, 201, 202, 203, 204, and 205 in the graph network corresponds to a vehicle (or camera) pose $x_0$, $x_1$, $x_2$, $x_3$, $x_4$, and $x_5$ at specific times $t_0$, $t_1$, $t_2$, $t_3$, $t_4$, and $t_5$ respectively. Graph factor optimization may determine vehicle poses $x_0$, $x_1$, $x_2$, $x_3$, $x_4$, and $x_5$. Nodes 200-205 may be connected by relationships, also referred to as factors. For instance, if a camera sees key point 230 at time to and at time $t_1$, the corresponding vehicle poses $x_0$ and $x_1$ may be connected by a relationship such that key point 230 may have the same fixed world coordinates. Hence, nodes 200, 201, 202, 203, 204, and 205 in the graph network are connected by geometric constraints related to key points 230, 231, 232, 233, and 234.

Nodes may also be connected by relationships or constraints related to lines. Lines may be detected and assigned a unique identifier, such as an identification number. The line identification number may be consistent from frame to frame as a camera takes images along a route (e.g., according to time intervals). There may be different ways to determine when a line in a frame corresponds to a line in preceding frames. For instance, the line equation can be used. Alternatively, each time the line detection is performed, a confidence score may be determined. When the confidence score drops below a certain threshold, a new line identification identifier can be assigned, for instance by incrementing the current line identification number. In other words, when multiple points are not well aligned, it may be assumed that this is because there is a new straight-line portion beginning and the line identification number may be incremented. This confidence score can be determined within each frame, thereby avoiding the need for location information. Alternatively, the line identification number can also be incremented after a predetermined number of frames. This could be beneficial if the confidence determination doesn't detect very low curvatures.

In the example of FIG. 2, nodes 200 and 201 may also be connected by constraint (or relationship) 210 related to a centerline having an identifier of "1" (Line1). The same centerline, Line1, may connect nodes 200 and 202 with another constraint 211. When a new line is detected (after Line1 is detected) another line identifier may be introduced. For example, the second line may have the identifier "2" (Line2). Line2 may also be a centerline. With the detection of a new line, a new set of constraints may be added. For instance, nodes 203, 204, and 205 may be connected by constraints 220 and 221 corresponding to Line2.

Constraints 210 and 211 may be geometric constraints related to Line1. Nodes 200 and 201 may, in addition to being connected by key point 230, be connected by constraint (or relationship) 210 related to centerline Line1. The same centerline, Line1, may connect nodes 200 and 202 with another constraint 211. Constraints 210 and 211 may be geometric constraints, however, constraints 210 and 211 may not be related to key points, but rather may be related to a geometric relationship between Line1 observed at $x_0$ and $x_1$ for constraint 210 and at $x_0$ and $x_2$ for constraint 211. As long as the vehicle follows a straight path, other poses can be connected using the same line (Line1). The geometric relationship can be a collinear relationship, meaning observed vehicle poses fall on the centerline. In a preferred embodiment, the geometric relationship can be a parallel relationship, which may be less rigid than a collinear relationship. A parallel relationship may mean that when two poses observe the same line, this line must be parallel (or constrained by a more general geometric constraint) with respect to the two poses in world coordinates independent of where the two poses observe the line (the line may be inside the navigable route). So, the vehicle may be free to move anywhere in the navigable route; if the navigable route is a straight route, the parallel constraint can be used. In other words, the vehicle may be free to move anywhere within the route, and the drift correction system can still correct the drift.

Other computational methods can be used to perform factor graph optimization, such as an error minimization method (e.g. gradient descent).

Figure 3:
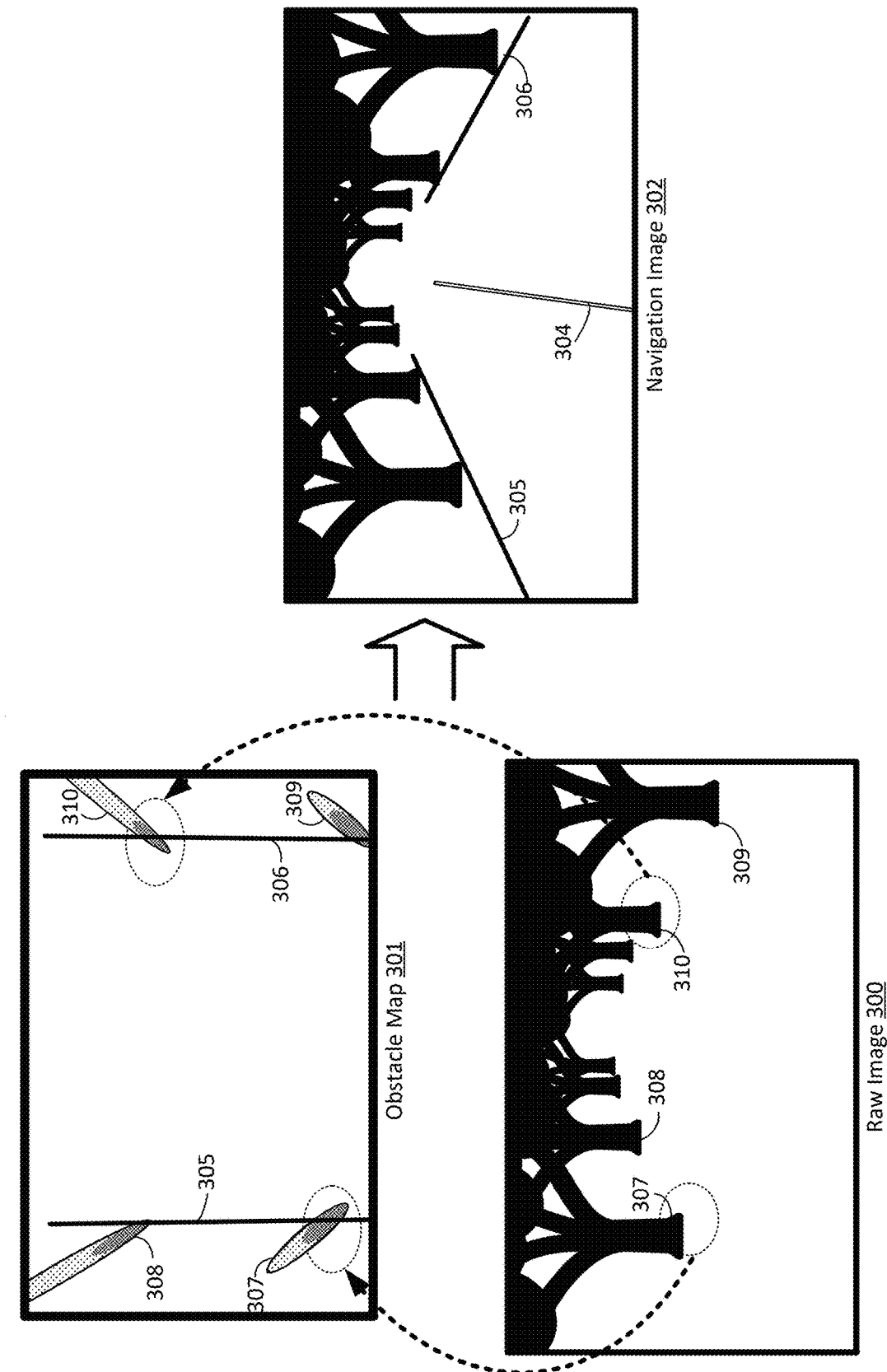
FIG. 3 provides an example of an obstacle map extracted from a raw image in accordance with specific embodiments of the inventions disclosed herein.
Figure 4:
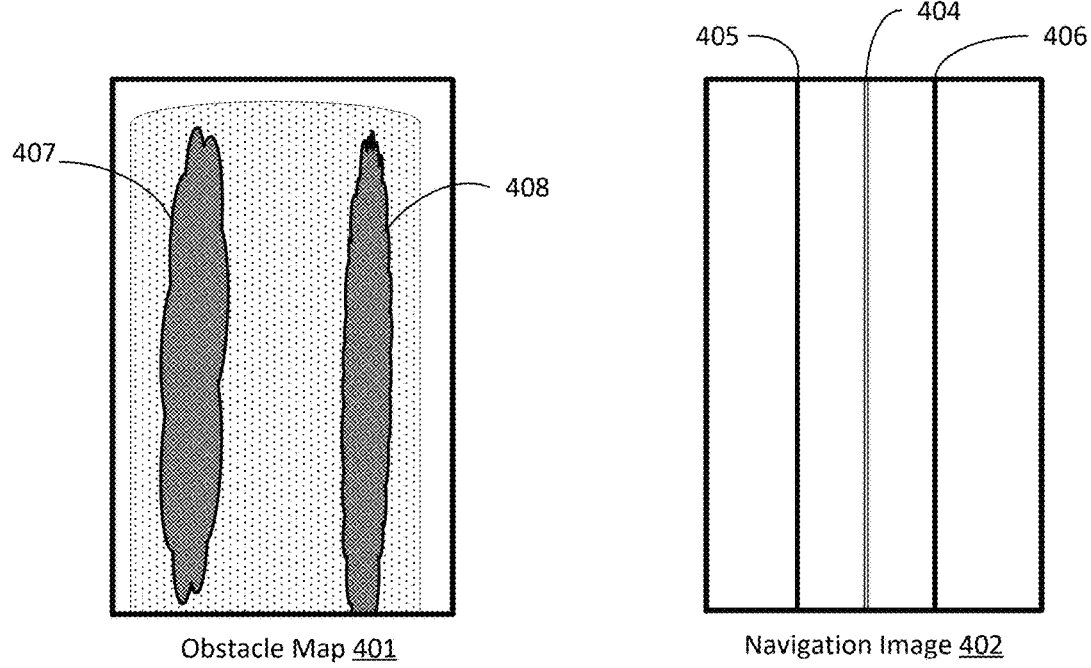
FIG. 4 provides an example of an aerial view of an obstacle map extracted from a raw image in accordance with specific embodiments of the inventions disclosed herein.
Figure 4:
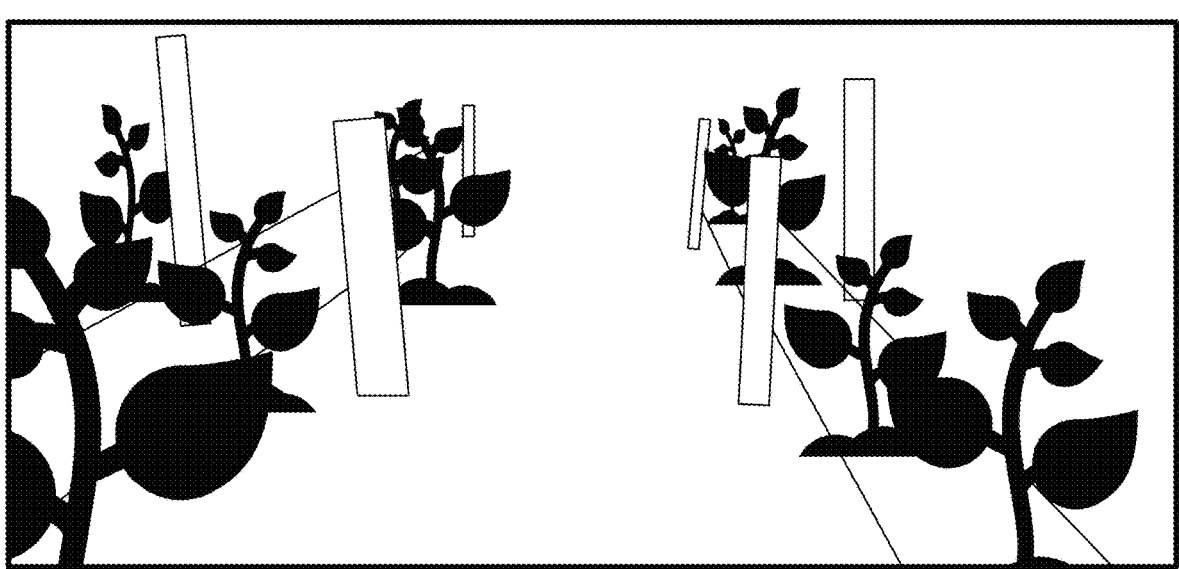

FIGS. 3 and 4 illustrate examples of obstacle maps and navigation images with centerlines and edges in accordance with specific embodiments of the inventions disclosed herein. The specific examples of FIGS. 3 and 4 demonstrate the navigation of a tractor between crop rows. The terms lines and rows may be used interchangeably. The obstacle map can be computed from a depth map for geometrical obstacles (of any type). A depth map may detect an object, but may be unable to determine the type of obstacle. Semantic analysis can label each obstacle (e.g., give their type) and this information can be integrated into the obstacle map. For example, a depth map may detect an object in the form of a small bump in the environment. Semantic analysis may determine whether this bump is traversable (e.g., a pile of dirt) or non-traversable (e.g., a fragile pipe). If the object is traversable, then then vehicle may ignore the bump; if the object is non-traversable, the vehicle may label the bump as an obstacle.

The depth map, including depth information, may be output by a stereo imaging system and a visual perception algorithm can use the depth information as an input to detect edges (line boundaries of a path) and determine the centerline equation. For instance, the stereo imaging system can output a 3D point cloud. The 3D point cloud can be converted into a height map from a ground plane. Lines can be detected based on the 2.5D height map combined with other inputs, such as deep learning methods or computer vision methods applied to the 2D images. In generating a height map, a confidence score associated with each point may be assessed. This confidence score can be based on how well (or poorly) pixels in the left and right images in a stereo pair are matched together. Advantageously, the confidence score may be used to discard some points of the height map that are too noisy, in other words, points with confidence score below a predetermined threshold.

Line measurements (e.g., edges) may be extracted from the obstacle map. The line measurements may be extracted by fitting lines using computer vision feature points and nonlinear optimization, or by using more complex, deep learning based, fitting algorithms. A simple linear regression can be used, but using a more general nonlinear optimization approach may improve results if other constraints are to be integrated into the fitting (e.g., temporal stability, a noise from stereo vision information, uncertainty of the obstacle map, etc.).

In outdoor environments, the localization sensors (e.g., radio localization sensors, GPS localization sensors, IMUs, and wheel odometry sensors) may provide ground truth, but this ground truth may be subject to noise. Vision based information (e.g., detected lines) may correct the noise and therefore improve the navigation accuracy. Localization sensors may provide ground truth with little to no drift; and vision-based information may provide long lines detected from frame to frame.

FIG. 3 illustrates an example of obstacle map 301 extracted from raw image 300 in accordance with specific embodiments of the inventions disclosed herein. Centerline 304, edge 305, and edge 306 from obstacle map 301 may be combined with raw image 300 to create navigation image 302. Raw image 300 shows a path between two rows of trees. In specific embodiments, a portion of the vehicle (e.g., hood) may be visible in the raw image, but this is not shown in FIG. 3. Raw image 300 may be taken by a camera (such as a stereo camera) mounted on the vehicle.

Edge 305 and edge 306 may be detected lines. The measurements of edge 305 may be based on obstacle 307 and obstacle 308, as well as obstacles that are outside the field of view of the image (e.g., that were previously in the field of view and geometrically close to the extension of the line of edge 305). Likewise, the measurements of edge 306 may be based on obstacle 309, obstacle 310, and other obstacles.

The equation of centerline 304 may be computed with respect to the camera coordinate frame. Centerline 304 may be the line measurement associated with raw image 300. Other centerlines may be associated with other raw images or navigation images. Multiple raw images and navigation images may be associated with the same centerline (e.g., with the same line identifier) as the vehicle travels along a straight path. Centerline 304 may be determined using any of several approaches. Centerline 304 may be determined by averaging the equations for edge 305 and edge 306. Centerline 304 may be determined via a linear combination of the equations for edge 305 and edge 306 (e.g., the path may not be in the middle of edge 305 and edge 306. Centerline 304 may be determined by offsetting either edge 305 or edge 306 half the width of the straight path or any other appropriate distance. Centerline 304 may not be strictly in the middle of the path, as long as centerline 304 is parallel to the path (such as parallel to one of the edges). In a preferred embodiment, the average, or more generally a linear combination of detected lines, may be used to average out the noise. Centerline 304 may be used to perform line clustering and for determining vehicle control signals.

FIG. 4 illustrates an example of obstacle map 401 extracted from raw image 400 with obstacle map 401 having an aerial view in accordance with specific embodiments of the inventions disclosed herein. Centerline 404, edge 405, and edge 406 are shown in navigation image 402, which is oriented as an aerial view. Raw image 400 shows a path between two rows of plants behind respective fences. In specific embodiments, a portion of the vehicle (e.g., hood) may be visible in the raw image, but this is not shown in FIG. 4. Raw image 400 may be taken by a camera (such as a stereo camera) mounted on the vehicle.

Edge 405 and edge 406 may be detected lines. The measurements of edge 405 may be based on set of obstacles 407 as well as obstacles that are outside the field of view of the image (e.g., that were previously in the field of view and geometrically close to the extension of the line of edge 405). Likewise, the measurements of edge 406 may be based on set of obstacles 408 and other obstacles.

The equation of centerline 404 may be computed with respect to the camera coordinate frame. Centerline 404 may be the line measurement associated with raw image 400. Other centerlines may be associated with other raw images or navigation images. Multiple raw images and navigation images may be associated with the same centerline (e.g., with the same line identifier) as the vehicle travels along a straight path. Centerline 404 may be determined using any of several approaches. Centerline 404 may be determined by averaging the equations for edge 405 and edge 406. Centerline 404 may be determined via a linear combination of the equations for edge 405 and edge 406 (e.g., the path may not be in the middle of edge 405 and edge 406). Centerline 404 may be determined by offsetting either edge 405 or edge 406 half the width of the straight path or any other appropriate distance. Centerline 404 may not be strictly in the middle of the path, as long as centerline 404 is parallel to the path (such as parallel to one of the edges). In a preferred embodiment, the average, or more generally a linear combination of detected lines, may be used to average out the noise. Centerline 404 may be used to perform line clustering and for determining vehicle control signals.

Figure 5:
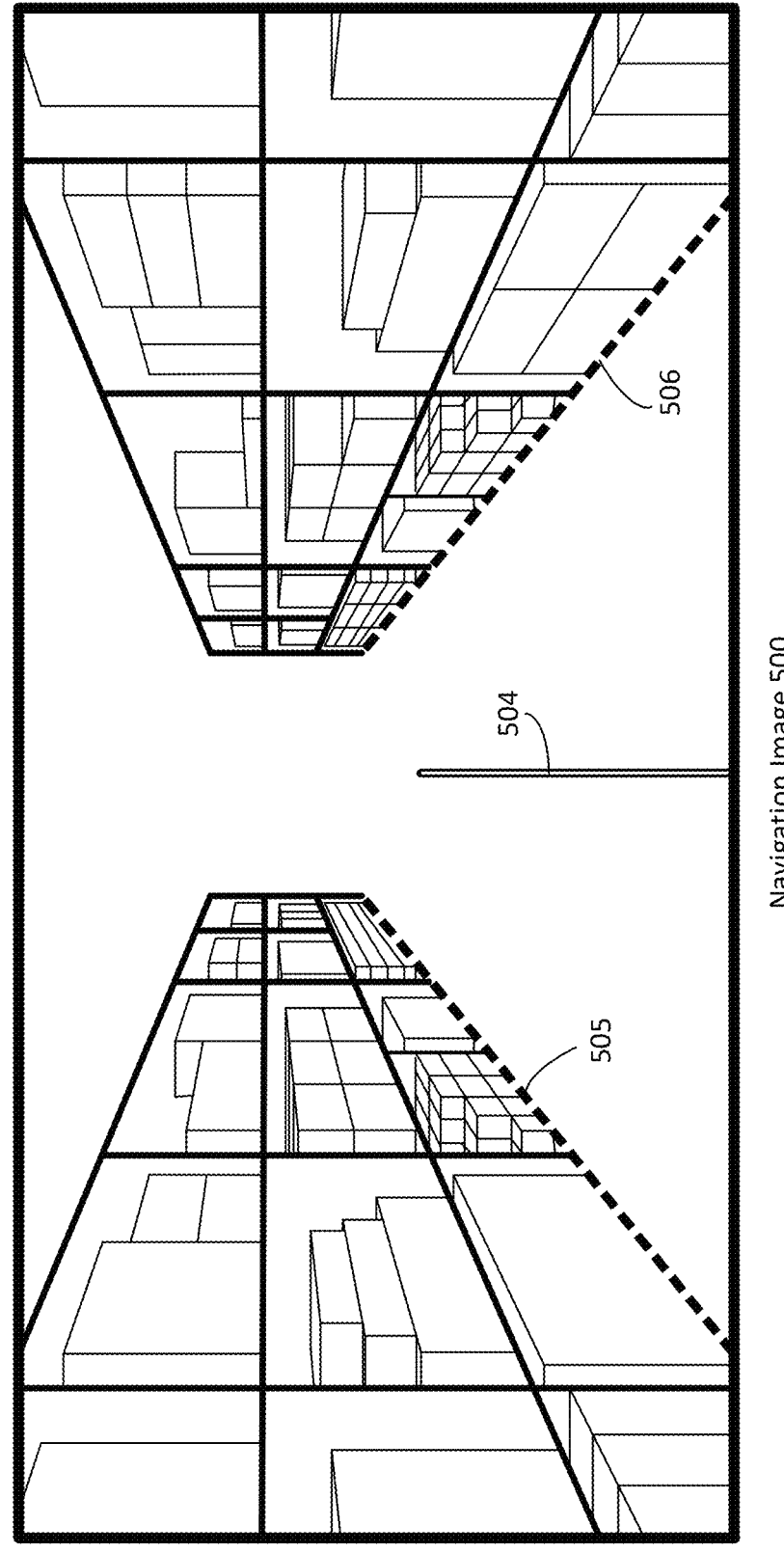
FIG. 5 provides an example of a navigation image for a vehicle in a warehouse in accordance with specific embodiments of the inventions disclosed herein.

FIG. 5 illustrates an example of navigation image 500 for a vehicle in a warehouse in accordance with specific embodiments of the inventions disclosed herein. The vehicle may be, for example, an AMR or an AGV. Navigation image 500 shows centerline 504, edge 505, and edge 506. Edge 505 and edge 506 align with the edges of shelves (obstacles) along the path. Navigation image 500 may be made up of a raw image of the warehouse aisle (e.g., taken by a camera mounted on the vehicle) and an obstacle map (e.g., computed using a 3D point cloud and/or height map). In specific embodiments, a portion of the vehicle (e.g., hood) may be visible, but this is not shown in FIG. 5.

Edge 505 and edge 506 may be detected lines. The measurements of edge 505 may be based on the shelving to the left, including portions of the shelving that are outside the field of view of the image (e.g., that were previously in the field of view). Likewise, the measurements of edge 506 may be based on the shelving to the right. The equation of centerline 504 may be computed with respect to the camera coordinate frame. Centerline 404 may be determined using any of several approaches, as discussed herein. Centerline 504 may not be strictly in the middle of the path, as long as centerline 504 is parallel to the path (such as parallel to one of the edges). Centerline 504 may be used to perform line clustering and for determining vehicle control signals.

In indoor environments, a list of fiducials (e.g., AprilTags, ArUco tags) with known locations or a map of the space (e.g., location of aisles and intersections in a manufacturing warehouse or a manufacturing plant) may provide ground truth. In other words, using visual information of specific and recognizable objects (e.g., AprilTags, ArUco tags, intersections) with known coordinates could provide the ground truth. However, this ground truth may be subject to noise. Vision based information (e.g., detected lines) may correct the noise and therefore improve the navigation accuracy. The list of fiducials may provide ground truth with little to no drift; and vision-based information may provide long lines detected from frame to frame.

The list of fiducials may include a variety of objects, including a combination of different object types. For example, the list may include electronic tags detected by a sensor mounted on the vehicle. The list may include colored or numbered markers identifiable by a sensor (e.g., camera) mounted on the vehicle. The fiducials may be located at specific locations in the indoor environment, such as at intersections, doorways, dead ends, periodic locations, along a wall, along a shelf, and at other locations of interest. The fiducials may be arranged in a pattern throughout the indoor environment, such as a grid pattern. The fiducials may be arranged at locations where the vehicle may perform actions such as turning, stopping, loading, and unloading. In specific embodiments, the fiducials may be key points.

Figure 6:
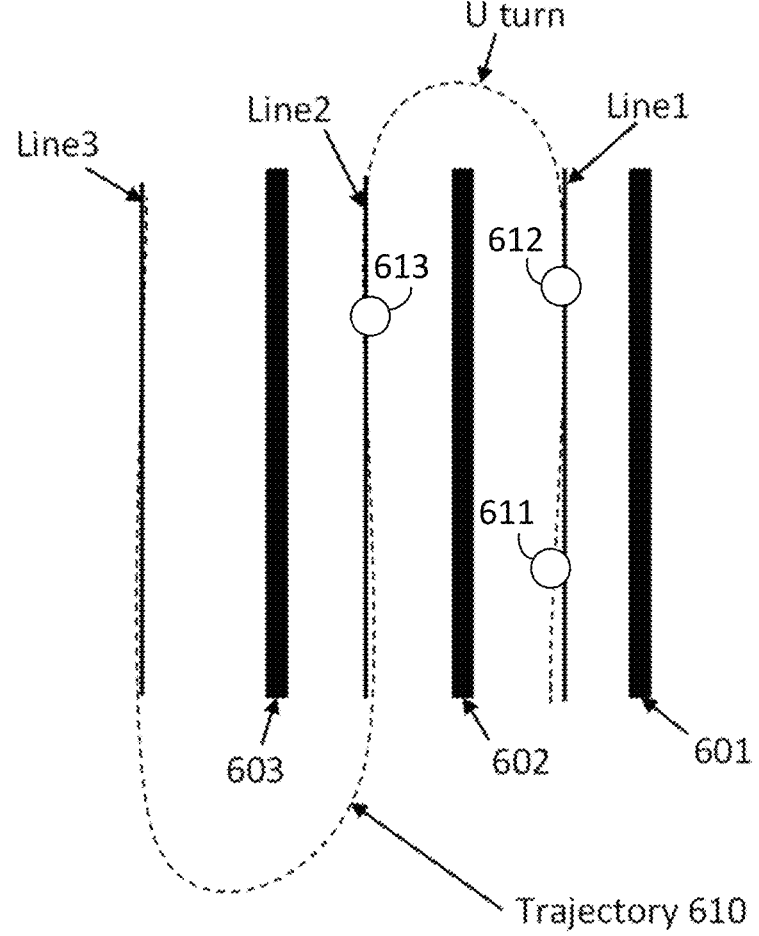
FIG. 6 provides an example of a cluster of rows in accordance with specific embodiments of the inventions disclosed herein.

FIG. 6 illustrates an example of a cluster of rows in accordance with specific embodiments of the inventions disclosed herein. Multiple obstacles may be clustered together to form rows of obstacles, such as row of obstacles 601. Additionally, multiple parallel lines (e.g., rows of obstacles, calculated centerlines) may be clustered together. Row clustering may be used to define relationships between camera localization at different timestamps that see the same line measurement. These relationships may be used by the factor graph optimization to correct the observed drift. Clustering parallel rows may assist in correcting errors in the visual positioning system.

A clustering step may be performed using the detected lines (e.g., rows of obstacles 601, 602, and 603). The history of the vehicle (or camera) locations may be maintained while navigating along the same line (e.g., Line1, Line2, or Line3); and the history may be associated with the line identification number of that line. This may produce a cluster of location histories associated with each line identification number. Groups of locations sharing the same line identification number may be assembled into a cluster of locations—a set of 3D positions observing the same line measurement.

In specific embodiments, multiple distinct obstacles (e.g., plants, fence posts, boxes, shelving racks) may be clustered together as a single row of obstacles. For example, row of obstacles 601 may be made up of multiple objects that are aligned along the line shown. The objects may not be completely aligned but may be aligned within a threshold such that the objects may be clustered together as a single row of obstacles.

In specific embodiments, multiple rows may be clustered together into a set of parallel rows. For example, Line1 may be parallel to Line2, which may be parallel to Line3. As a result of their parallel relationship, Line1, Line2, and Line3 may be clustered together. Rows of obstacles 601, 602, and 603 may likewise be parallel and clustered together. Rows of obstacles 601, 602, and 603 may be parallel to Line1, Line2, and Line3 and, in specific embodiments, may all be clustered together.

A vehicle may travel along trajectory 610, which may include U turns. The vehicle may include a navigation system including sensors and computational components for autonomous or semiautonomous navigation. At position 611, the navigation system (e.g., via sensors and computations) may detect Line1, row of obstacles 601, and row of obstacles 602. Similarly, at position 612, the navigation system may detect Line1, row of obstacles 601, and row of obstacles 602. The navigation system may recognize multiple aligned objects as belonging to a single row of obstacles. At position 613, the navigation system (e.g., via sensors and computations) may detect Line2, row of obstacles 602, and row of obstacles 603. The navigation system may recognize row of obstacles 602 as the same row of obstacles 602 detected at position 612.

In specific embodiments, obstacles may be short enough (or the camera may be mounted high enough) for the navigation system to see and detect more than one row of obstacles at a time. For example, the camera, while at position 611, may be able to see over row of obstacles 602 to detect row of obstacles 603. In specific embodiments, rows of obstacles may be (e.g., pre-labeled or measured as) parallel such that the navigation system may use information from row of obstacles 603 to create Line1 or correct drift. Information from row of obstacles 603 may be used in addition to information from rows of obstacles 601 and 602.

Figure 7:
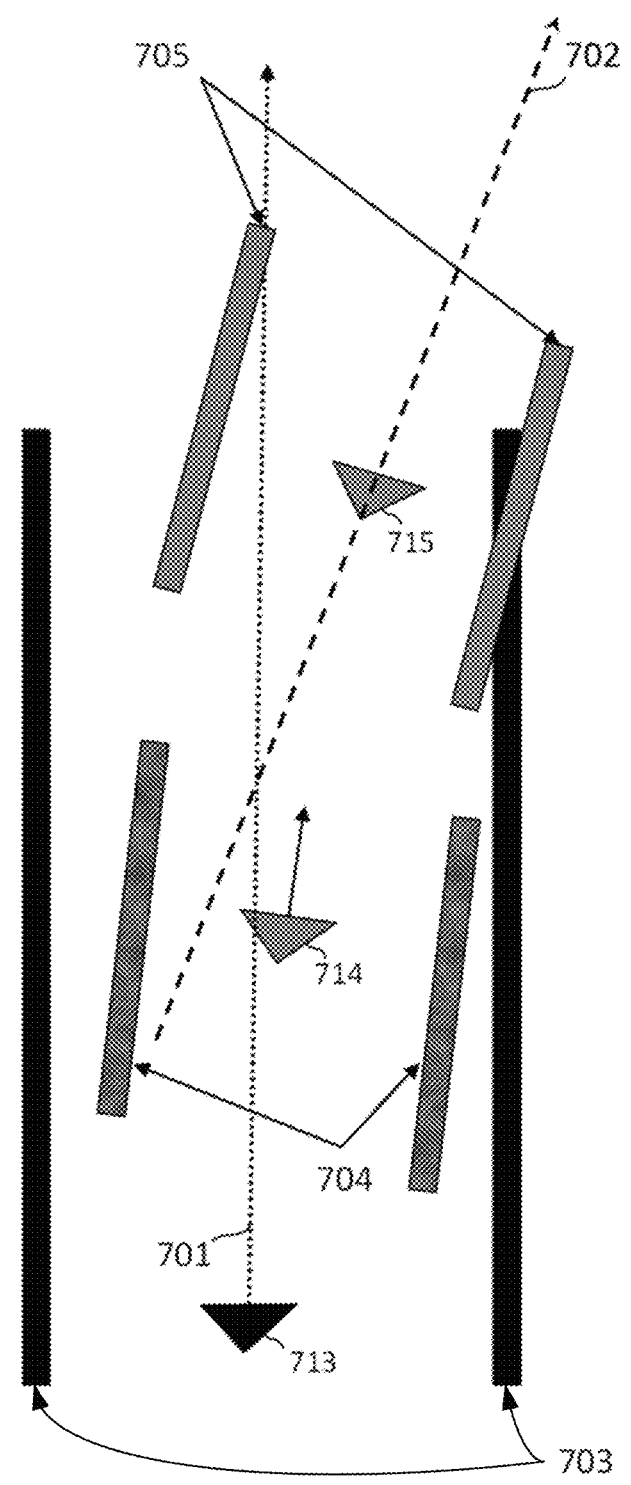
FIG. 7 provides an example of using a pair of line measurements to correct drift in accordance with specific embodiments of the inventions disclosed herein.

FIG. 7 illustrates an example of using a pair of line measurements to correct drift in accordance with specific embodiments of the inventions disclosed herein. Given the observation of the same line (with its identification number) in multiple images, factor graph optimization may be able to fix the accumulated drift of the system. FIG. 7 shows the correction principle using reference line 701 and candidate line 702. Reference line 701 (dotted line) may be a measurement from a past image and may be calculated based on obstacles 703. Candidate line 702 (dashed line) may be a measurement from a current image and may be calculated based on detected obstacles 705 (which may be incorrect due to drift). If an error occurred in the localization estimation, then comparing reference line 701 and candidate line 702 may show a mismatch. This mismatch may be expressed as a constraint between lines 701 and 702. The constraint may say that lines 701 and 702 must be parallel if, while the vehicle is on line 701 or line 702, the navigation system sees the same line identification measurements (e.g., the line identification for each of the lines of obstacles 703). By inserting all possible line constraints into the factor graph optimization in addition to normal simultaneously localization and mapping (SLAM) constraints, the localization solution may simultaneously respect SLAM and line constraints (e.g., correct lateral drift).

The pair of lines for obstacles 703 represents the actual obstacles, which are fixed, as viewed by the camera at position 713. The pair of lines for detected obstacles 704 represents an intermediate view of the obstacles seen by the drifted camera at position 714. The pair of lines for detected obstacles 705 represents the obstacles seen by the drifted camera at position 715. Candidate line 702 may be based on detected obstacles 705, as detected at camera position 715. If detected obstacles 705 were accurate, then candidate line 702 may be an appropriate line in the image coordinate frame. However, in the example of FIG. 7, detected obstacles 705 are inaccurate due to drifting. If reference line 701 is projected onto candidate line 702, a mismatch of reference line 701 and candidate line 702 is observed, revealing the drift. Realigning the candidate line 702 and reference line 701 may correct the lateral drift.

FIG. 8 illustrates an example of method 800 for navigating a vehicle in accordance with specific embodiments of the inventions disclosed herein. Method 800 may be implemented by a system including one or more cameras mounted on the vehicle, one or more actuators, one or more processors, and one or more non-transitory computer-readable media. In specific embodiments, the system may also include one or more localization sensors on the vehicle. Method 800 may be implemented by a system including means for performing the steps of method 800. Steps, or portions of steps, of method 800 may be duplicated, omitted, rearranged, or otherwise deviate from the form shown. Additional steps may be added to method 800. Steps, or portions of steps, of method 800 may be performed in series or parallel.

In specific embodiments, the vehicle may be selected from a group consisting of: a robot, a car, a truck, and a tractor. The category of robot may include AMRs and AGVs. The vehicle may be navigating an outdoor environment or an indoor environment.

At step 802, navigation coordinates may be received. The navigation coordinates may define a route comprising a straight path. In specific embodiments, the navigation coordinates may be GPS coordinates.

In specific embodiments, at step 804, a 3D point cloud may be derived from stereo images captured using the at least one camera. The at least one camera may include a stereo pair of cameras.

In specific embodiments, at step 806, a height map may be generated from the 3D point cloud.

In specific embodiments, at step 808, a confidence score may be applied to each point in the height map based on an image matching analysis between two images captured by the stereo pair of cameras. In specific embodiments, the confidence scores can be based on how well (or poorly) pixels in the left and right images in a stereo pair are matched together.

In specific embodiments, at step 810, points from the height map may be discarded based on the confidence score being below a threshold for the discarded points. In specific embodiments, discarding these points may reduce noise and improve accuracy. In specific embodiments, the height map may determine obstacle locations. In specific embodiments, the obstacles may be parallel to the path.

At step 812, detected lines that are parallel to the straight path may be detected based on images received from at least one camera on the vehicle. In specific embodiments, the detected lines may be based on detected obstacles in the images. In specific embodiments, the detected lines may be detected based on the height map (e.g., from step 810, with discarded points). In specific embodiments, a visual perception algorithm can use the depth information as an input to detect the detected lines (e.g., line boundaries of a path) and determine the centerline equation. For instance, the visual position system may use a 3D point cloud or height map output by the stereo imaging system. Lines can be detected based on the 2.5D height map combined with other inputs, such as deep learning methods or computer vision methods applied to the 2D images.

At step 814, ground truth data may be accessed. In specific embodiments, the ground truth data may be obtained by one or more localization sensors. The one or more localization sensors may include at least one of the sensors selected from the group consisting of: radio localization sensors, GPS localization sensors, IMUs, and wheel odometry sensors. In specific embodiments, the ground truth data may include location information for one or more external features. In specific embodiments, the location information may be preprogrammed or a priori knowledge. Specific external features may have specific world coordinates. The ground truth data regarding the external features may be in a world coordinate system (e.g., the definition of a location using x, y, and z coordinates relative to the center of the Earth or using latitude, longitude, and elevation). In specific embodiments, the one or more external features may be tags (e.g., electronic, visual, ArUco). For example, a specific tag may be placed at the first trellis post of a first row of grapes in a vineyard. The vehicle may determine, through measurement of the tag (including a distance and orientation to the tag), that the vehicle is located at the first row of the vineyard (with the specific distance and orientation to the first post). As another example, a specific tag may be labeled as part of a map of the environment and may be defined relative to other tags (e.g., environmental coordinates, rather than world coordinates). In specific embodiments, the ground truth data may be a priori knowledge of a scene. The a priori knowledge may persist beyond any camera field of view. An example of a priori knowledge may be lines (e.g., the detected lines) parallel to straight path sections. As these lines follow the path, their orientation can be measured at different places without any field of view limitation. In other words, different sections of the same line can be observed at different time steps, even if the earlier sections are no longer in the field of view when observing the later sections.

At step 816, vehicle coordinates may be derived from the ground truth data (e.g., accessed at step 808). In specific embodiments, the vehicle coordinates may include an orientation and a location of the vehicle.

At step 818, a centerline in vehicle coordinates may be determined based on the detected lines (e.g., detected at step 804). Several approaches exist for determining the centerline equation in vehicle coordinates. The centerline may be determined by averaging the equations of the detected lines. The centerline may be determined via a linear combination of a plurality of detected line equations if the path is not in the middle of a left detected line and a right detected line. The centerline may be determined by offsetting one of the detected lines by half the width of the straight path or any other appropriate distance. The average, or more generally a linear combination of detected lines, may be used to average out the noise. The centerline may be used to perform line clustering and for determining vehicle control signals. The centerline may be offset from the middle of the path (e.g., not in the center), but may still be parallel to the path (e.g., parallel to one of the detected lines).

At step 820, corrected vehicle coordinates may be determined based on the centerline in vehicle coordinates (e.g., determined at step 818) and the vehicle coordinates from the ground truth data (e.g., derived at step 808). In specific embodiments, the corrected vehicle coordinates may be determined using a factor graph optimization.

At step 822, control signals to navigate the vehicle along the route may be generated using the corrected vehicle coordinates (e.g., determined at step 820). In specific embodiments, the vehicle may use the control signal to navigate along the route.

At least one processor in accordance with this disclosure can include at least one non-transitory computer readable media. The at least one processor could comprise at least one computational node in a network of computational nodes. The media could include cache memories on the processor. The media can also include shared memories that are not associated with a unique computational node. The media could be a shared memory, could be a shared random-access memory, and could be, for example, a double data rate (DDR) dynamic random-acess memory (DRAM). The shared memory can be accessed by multiple channels. The non-transitory computer readable media can store data (including ground truth data, mapping data, intermediate values, preconfigured coordinates of tag locations, location histories, etc.) required for the execution of any of the methods disclosed herein, the instruction data disclosed herein, and/or the operand data disclosed herein. The computer-readable media can also store instructions which, when executed by the system, cause the system to execute the methods disclosed herein. The concept of executing instructions is used herein to describe the operation of a device conducting any logic or data movement operation, even if the "instructions" are specified entirely in hardware (e.g., an AND gate executes an "and" instruction). The term is not meant to impute the ability to be programmable to a device.

While the specification has been described in detail with respect to specific embodiments of the invention, it will be appreciated that those skilled in the art, upon attaining an understanding of the foregoing, may readily conceive of alterations to, variations of, and equivalents to these embodiments. Any of the method steps discussed above can be conducted by a processor operating with a computer-readable non-transitory medium storing instructions for those method steps. The computer-readable medium may be memory within a personal user device or a network accessible memory. These and other modifications and variations to the present invention may be practiced by those skilled in the art, without departing from the scope of the present invention, which is more particularly set forth in the appended claims.

What is claimed is:

1. A method for navigating a vehicle, comprising:
receiving navigation coordinates defining a route comprising a straight path;
receiving, according to a first time frequency, pairs of images from a stereo imaging system on the vehicle, each pair of images providing depth information about the straight path;
detecting detected lines that are parallel to the straight path based on a subset of the pairs of images, the subset of the pairs of images being received according to a second time frequency slower than the first time frequency and from the stereo imaging system on the vehicle;
assigning each detected line a unique line identifier;
recognizing, based on a unique line identifier corresponding to a detected line, the detected line in a first pair of images in the subset of the pairs of images and in a second pair of images in the subset of the pairs of images;
accessing location information;
deriving vehicle coordinates from the location information;
determining a centerline in vehicle coordinates based on the detected lines in the first pair of images and the second pair of images;
determining corrected vehicle coordinates based on the centerline in vehicle coordinates and the vehicle coordinates from the location information; and
generating control signals to navigate the vehicle along the route using the corrected vehicle coordinates.

2. The method of claim 1, wherein the vehicle is selected from the group consisting of: a robot, a car, a truck, and a tractor.

3. The method of claim 1, wherein:
the location information is obtained by one or more localization sensors; and
the one or more localization sensors include at least one of the sensors selected from the group consisting of: radio localization sensors, global positioning system (GPS) localization sensors, inertial measurement units (IMUs), and wheel odometry sensors.

4. The method of claim 1, wherein the location information includes location information for one or more external features that are visible to the stereo imaging system.

5. The method of claim 4, wherein the location information is preprogrammed in a world coordinate system.

6. The method of claim 4, wherein the one or more external features are tags.

7. The method of claim 1, further comprising:
deriving a three-dimensional point cloud from stereo images captured using the stereo imaging system, wherein the stereo imaging system includes a stereo pair of cameras;
generating a height map from the three-dimensional point cloud;
applying a confidence score to each point in the height map based on an image matching analysis between two images captured by the stereo pair of cameras; and
discarding points from the height map based on the confidence score being below a threshold for the discarded points;
wherein detecting the detected lines is based on the height map after the discarded points have been discarded.

8. The method of claim 1, wherein the corrected vehicle coordinates are determined using a factor graph optimization.

9. The method of claim 1, wherein the vehicle coordinates include an orientation and a location of the vehicle.

10. The method of claim 1, wherein the navigation coordinates are global positioning system (GPS) coordinates.

11. A system for navigating a vehicle, comprising:

one or more cameras mounted on the vehicle;

one or more actuators;

one or more processors; and one or more non-transitory computer-readable media storing instructions that, when executed by the one or more processors, cause the system to execute a method comprising:

receiving navigation coordinates defining a route comprising a straight path;

receiving, according to a first time frequency, pairs of images from the one or more cameras, each pair of images providing depth information about the straight path;

detecting detected lines that are parallel to the straight path based on a subset of the pairs of images, the subset of the pairs of images being received according to a second time frequency slower than the first time frequency and from the one or more cameras;

assigning each detected line a unique line identifier;

recognizing, based on a unique line identifier corresponding to a detected line, the detected line in a first pair of images in the subset of the pairs of images and in a second pair of images in the subset of the pairs of images;

accessing location information;

deriving vehicle coordinates from the location information;

determining a centerline in vehicle coordinates based on the detected lines in the first pair of images and the second pair of images;

determining corrected vehicle coordinates based on the centerline in vehicle coordinates and the vehicle coordinates from the location information; and generating control signals for the one or more actuators to navigate the vehicle along the route using the corrected vehicle coordinates.

12. The system of claim 11, wherein the vehicle is selected from the group consisting of: a robot, a car, a truck, and a tractor.

13. The system of claim 11, further comprising:

one or more localization sensors on the vehicle;

wherein the one or more localization sensors are selected from the group consisting of radio localization sensors, global positioning system (GPS) localization sensors, inertial measurement units, and wheel odometry sensors.

14. The system of claim 11, further comprising:

one or more localization sensors on the vehicle;

wherein the location information is obtained by the one or more localization sensors.

15. The system of claim 11, wherein the location information includes location information for one or more external features that are visible to the one or more cameras.

16. The system of claim 15, wherein the location information is preprogrammed in a world coordinate system.

17. The system of claim 15, wherein the one or more external features are tags.

18. The system of claim 11, the method further comprising:

deriving a three-dimensional point cloud from stereo images captured using the one or more cameras, wherein the one or more cameras includes a stereo pair of cameras;

generating a height map from the three-dimensional point cloud;

applying a confidence score to each point in the height map based on an image matching analysis between two images captured by the stereo pair of cameras; and discarding points from the height map based on the confidence score being below a threshold for the discarded points;

wherein detecting the detected lines is based on the height map after the discarded points have been discarded.

19. The system of claim 11, wherein the corrected vehicle coordinates are determined using a factor graph optimization.

20. The system of claim 11, wherein the vehicle coordinates include an orientation and a location of the vehicle.

21. The system of claim 11, wherein the navigation coordinates are global positioning system (GPS) coordinates.

22. One or more non-transitory computer-readable media storing instructions, which when executed by one or more processors cause the one or more processors to conduct a method for navigating a vehicle, the method comprising:

receiving navigation coordinates defining a route comprising a straight path;

receiving, according to a first time frequency, pairs of images from at least one camera on the vehicle, each pair of images providing depth information about the straight path;

detecting detected lines that are parallel to the straight path based on a subset of the pairs of images, the subset of the pairs of images being received according to a second time frequency slower than the first time frequency and from the at least one camera on the vehicle;

assigning each detected line a unique line identifier;

recognizing, based on a unique line identifier corresponding to a detected line, the detected line in a first pair of images in the subset of the pairs of images and in a second pair of images in the subset of the pairs of images;

accessing location information;

deriving vehicle coordinates from the location information;

determining a centerline in vehicle coordinates based on the detected lines in the first pair of images and the second pair of images;

determining corrected vehicle coordinates based on the centerline in vehicle coordinates and the vehicle coordinates from the location information; and generating control signals to navigate the vehicle along the route using the corrected vehicle coordinates.

23. The one or more non-transitory computer-readable media of claim 22, wherein the vehicle is selected from the group consisting of: a robot, a car, a truck, and a tractor.

24. The one or more non-transitory computer-readable media of claim 22, wherein:

the location information is obtained by one or more localization sensors; and the one or more localization sensors include at least one of the sensors selected from the group consisting of: radio localization sensors, global positioning system (GPS) localization sensors, inertial measurement units (IMUs), and wheel odometry sensors.

25. The one or more non-transitory computer-readable media of claim 22, wherein the location information includes location information for one or more external features that are visible to the at least one camera.

26. The one or more non-transitory computer-readable media of claim 25, wherein the location information is preprogrammed in a world coordinate system.

27. The one or more non-transitory computer-readable media of claim 25, wherein the one or more external features are tags.

28. The one or more non-transitory computer-readable media of claim 22, the method further comprising:

deriving a three-dimensional point cloud from stereo images captured using the at least one camera, wherein the at least one camera includes a stereo pair of cameras;

generating a height map from the three-dimensional point cloud;

applying a confidence score to each point in the height map based on an image matching analysis between two images captured by the stereo pair of cameras; and discarding points from the height map based on the confidence score being below a threshold for the discarded points;

wherein detecting the detected lines is based on the height map after the discarded points have been discarded.

29. The one or more non-transitory computer-readable media of claim 22, wherein the corrected vehicle coordinates are determined using a factor graph optimization.

30. The one or more non-transitory computer-readable media of claim 22, wherein the vehicle coordinates include an orientation and a location of the vehicle.

*  *  *  *  *